J. T. WALLIS.
CAR TRUCK.
APPLICATION FILED MAY 14, 1919.
1,404,671.
Patented Jan. 24, 1922.
2 SHEETS—SHEET 2.
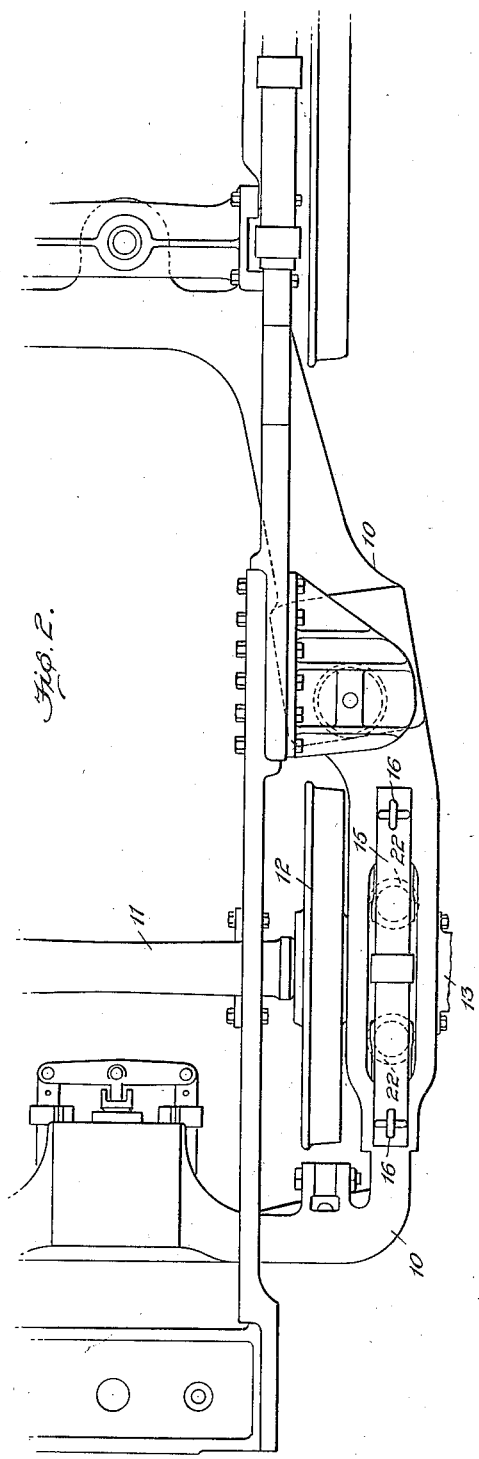
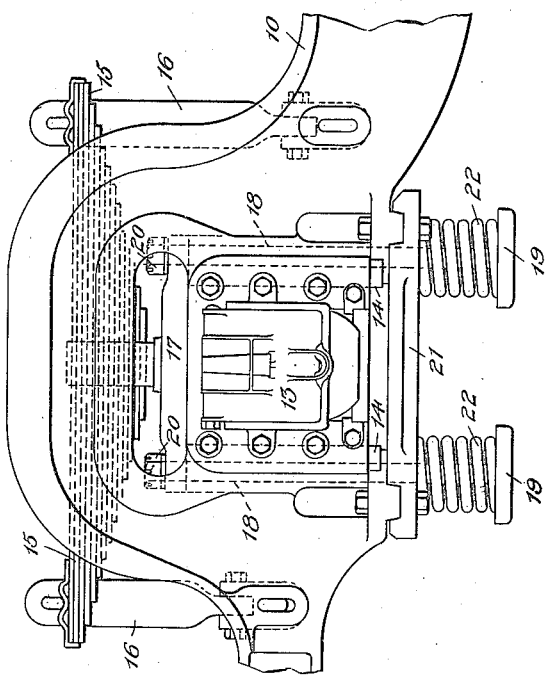
Inventor
James T Wallis,
By Foster, Freeman, Watson & Coit,
Attorneys.

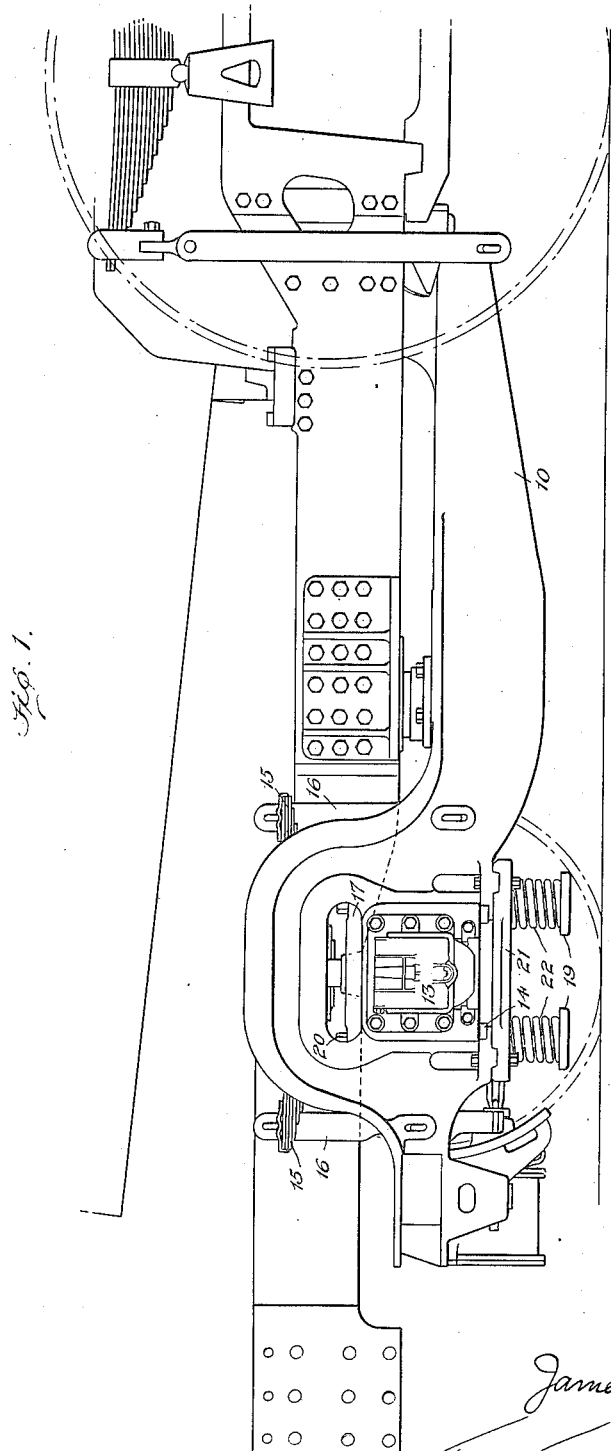

UNITED STATES PATENT OFFICE.

JAMES T. WALLIS, OF ALTOONA, PENNSYLVANIA.

CAR TRUCK.

1,404,671.   Specification of Letters Patent.   Patented Jan. 24, 1922.

Application filed May 14, 1919. Serial No. 296,975.

*To all whom it may concern:*

Be it known that I, JAMES T. WALLIS, a citizen of the United States, and residing at Altoona, Blair County, State of Pennsylvania, have invented certain new and useful Improvements in Car Trucks, of which the following is a specification.

This invention relates to improvements in car truck constructions and particularly to improvements in locomotive trailer trucks.

In Patent No. 929,768 of August 3, 1909, granted to William F. Kiesel, jr., is illustrated and described a locomotive trailer truck the frame of which is fulcrumed in front of the locomotive ash pan, the rear portion of the frame being susceptible of any desired side motion and the frame itself acting as an equalizer between the rear end of the back driver springs and the trailer axle springs. The present invention will be described in a particular application to a locomotive trailer truck such as disclosed in the above mentioned patent, but it will be understood that its use is not confined to devices of this exact character, it being applicable to any car truck construction in which a car frame is supported on axles having wheels mounted thereon intermediate the journals, that is, in all cases in which the load due to the weight of the frame and the contents of the car is transmitted to the axles through journal boxes which are mounted thereon on the outside of the wheels instead of on the inside.

It has been the fault of constructions of this character utilized in the past in car building that whenever one of the springs interposed between one of the journal boxes and the car frame broke while the car was running, or the spring hanger or other connection between the spring and car frame broke, that this end of the axle was immediately relieved of load while the opposite end was subjected to an increased load, thus causing the axle to tilt about the wheel on the side of the car having the unbroken spring, raising as a consequence the opposite wheel from the rail and causing immediate danger of derailment.

It is the object of this invention to provide means whereby this danger of derailment is obviated and which permits the car truck to continue in use without such danger until a convenient place is reached for repairing the broken spring or spring hanger.

The invention will be fully disclosed in the following description when taken in connection with the accompanying drawings in which:

Figure 1 is a side view of a portion of a locomotive showing a trailer truck having my improvement incorporated therein;

Figure 2 is a plan view of one-half of the trailer truck; and

Figure 3 is an enlarged side view of one of the journal boxes.

The frame of the trailer truck is indicated at 10 in the drawings, the trailer truck axle at 11, and the usual supporting wheels, only one of which is shown, at 12. The wheels 12 are mounted intermediate the ends of the axle 11 and the ends of the axle 11 are journaled in the well known manner in axle boxes 13, only one of which is shown.

These axle boxes 13 have a limited vertical movement between the guides or pedestals 14 secured to the frame 10. Mounted on the top of each of the axle boxes is the usual semi-elliptic spring 15 having its ends connected to the frame by spring hangers 16 and adapted to absorb the smaller vibrations transmitted to the wheels and axle by the track.

The top of each axle box has secured thereto a cross piece 17, the ends of which overhang the sides of the axle box and are provided with circular holes to receive bolts or rods 18 which are vertically disposed and have enlarged annular lower ends 19 and threaded upper ends provided with nuts 20. Extending horizontally between the portions of the frame located below the guides or pedestals 14 is a member 21, which constitutes the upper abutment against which the coiled spring 22 bears, these coiled springs being held in place by the bolts 18 which pass upwardly through them, and the enlarged heads 19 on the lower ends of the bolts constituting the lower abutments for the said springs.

The springs 22 therefore constitute additional load bearing and shock absorbing members between the trailer truck axle and axle box and the frame of the truck and are auxiliary springs assisting the semi-elliptic spring 15. By adjusting the nuts 20 the amount of load which these springs normally carry can be accurately established. I have found it desirable to have the spring 15 carry two-thirds of the load on the journals and the springs 22 carry the remaining one-third. This permits of the spring 15 being made lighter, but I do not limit myself to any definite proportion of the whole load which each spring is to carry, and by adjusting the nuts 20 may change the proportions, as desired.

As a result of the above construction it will be seen that the dead weight transmitted to the axle and wheels from the frame passes partly through the main spring 15 and partly through the auxiliary springs 22, and that in case, as sometimes happens, the main spring or one of the spring hangers 16 is broken while the locomotive or other car is moving, the end of the axle, adjacent the broken spring, will not be relieved of all weight but that the auxiliary spring will transmit a sufficient amount to the axle through the axle box to hold the wheel at this end of the axle in contact with the rail. The locomotive or other car may be run therefore with a main spring broken without danger of derailment until a convenient place is reached where repairs can be made.

It will be apparent that numerous modifications of the arrangement of springs illustrated in the drawings and described above may be made in accomplishing the objects of the invention and I do not limit myself to the exact form shown and described. The scope of the invention is indicated in the appended claims.

Having thus described the invention what is claimed as new and desired to be secured by Letters Patent is:

1. In a car truck construction, in combination, a frame, axle boxes, a truck axle having its ends journaled in said axle boxes and having wheels intermediate said axle boxes, a semi-elliptic spring mounted on each of said axle boxes, spring hangers connecting the ends of said springs to the frame, an auxiliary coiled compression spring interposed between each of said axle boxes and said frame for supporting a portion of said load on the axle boxes, for the purpose set forth.

2. In a car truck construction, in combination, a frame, axle boxes, a truck axle having its ends journaled in said axle boxes and having wheels intermediate said axle boxes, a main semi-elliptic spring mounted on each axle box and having its ends connected to the frame, auxiliary coiled compression springs interposed between the axle boxes and the frame for transmitting a portion of the load of the axle, and means for adjusting the length of said springs to vary the proportion of load it carries.

3. In a car truck construction, in combination, a frame, axle boxes, a truck axle having its end journaled in said axle boxes and having wheels intermediate said axle boxes, a main spring supporting a portion of the frame load on said axle boxes, a cross piece mounted on the top of each axle box, a vertically disposed bolt connected to each end of said cross piece and having enlarged lower end portions below said axle box, and coiled springs interposed between said enlarged end portions and the frame, for the purpose set forth.

4. In a device of the class described, the combination with a main spring connecting the axle boxes with the frame of a truck, of an auxiliary spring interposed between the frame and each axle box and adapted to normally take approximately one-third of the load to be transmitted to the axle, and to take an increased amount of the load in case of the failure of the main spring or its connections, for the purpose set forth.

5. In a car truck construction, in combination, a truck frame, axle boxes vertically movable relatively to the truck frame, a truck axle having its ends journaled in said axle boxes and having wheels intermediate the ends, a main spring connecting the frame and an axle box for supporting a portion of the load, and an auxiliary spring interposed between the frame and an axle box for supporting a portion of said load, for the purpose set forth.

In testimony whereof I affix my signature.

JAMES T. WALLIS.